(No Model.)

G. O. WICKERS.
FEED APRON.

No. 500,521. Patented June 27, 1893.

Witnesses
Edward F. Allen.
Louis N. Gowell.

Inventor:
George O. Wickers.
by Crosby & Gregory
attys.

THE NORRIS PETERS CO., PHOTO-LITHO., WASHINGTON, D. C.

UNITED STATES PATENT OFFICE.

GEORGE O. WICKERS, OF LAWRENCE, ASSIGNOR TO THE DAVIS & FURBER MACHINE COMPANY, OF NORTH ANDOVER, MASSACHUSETTS.

FEED-APRON.

SPECIFICATION forming part of Letters Patent No. 500,521, dated June 27, 1893.

Application filed January 3, 1893. Serial No. 457,102. (No model.)

*To all whom it may concern:*

Be it known that I, GEORGE O. WICKERS, of Lawrence, county of Essex, State of Massachusetts, have invented an Improvement in Feed-Aprons for Machines for Drying Wool and other Fibers, of which the following description, in connection with the accompanying drawings, is a specification, like letters and figures on the drawings representing like parts.

Wool and other fiber to be dried is carried through the drying apparatus by aprons, but in practice these aprons cause a great deal of trouble by getting out of shape and the construction of the aprons is such as to retard the free circulation of air and heat through the mass of wool or other material thereon.

In my experiments to improve the durability and usefulness of machines for drying wool and other fiber, and at the same time expedite the drying operation, I have devised a novel apron composed of slats connected at each end to a link of a chain, the several chain links being joined together end to end, said slats being preferably of metal.

The slats are shown as perforated for the free passage of air and heat.

Figure 1:
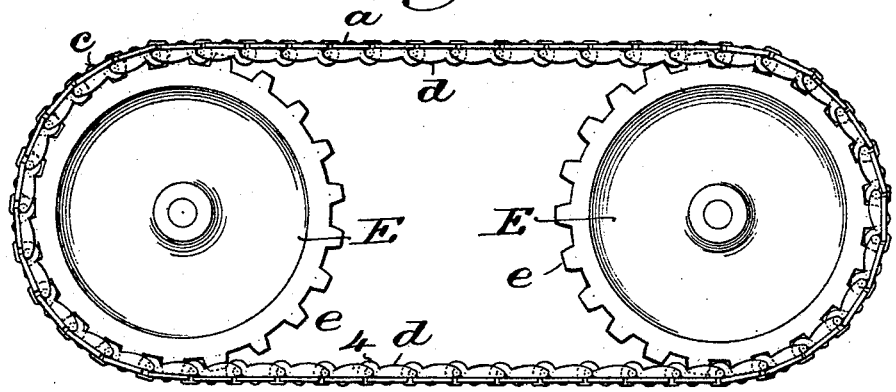
Figure 2:
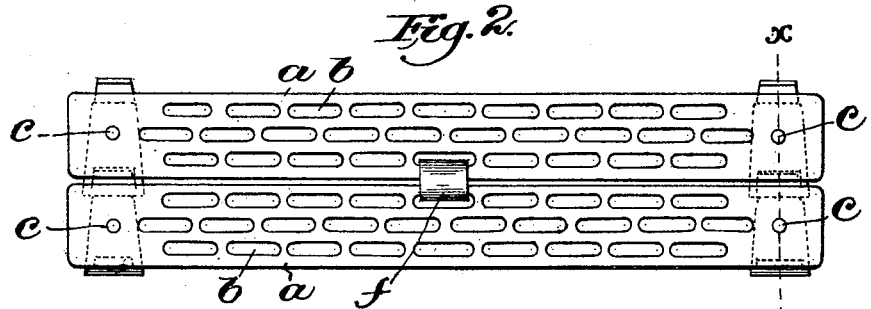
Figure 3:
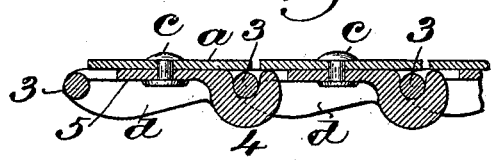
Figure 4:
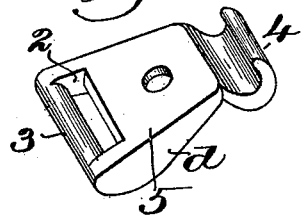

Figure 1, in side elevation shows part of a feeding apron and sprocket wheels to move it; Fig. 2, an enlarged plan view of two slats and the chain links to which they are attached. Fig. 3 is a section in the line $x$ Fig. 2, and Fig. 4 shows one of the chain links detached to better illustrate its shape.

The bars $a$ are composed preferably of sheet metal, suitably tinned, galvanized, or otherwise treated, to prevent the formation of rust. These bars are provided with a series of ventilating spaces $b$, which allow the free passage of air, or it might be moisture, and at the same time the spaces make the bars lighter in weight and yet leave the bars very strong. The bars are attached at their ends by rivets $c$ to chain links $d$. The chain links are composed of rectangular loops 2, having at one end a cross-bar 3, and at its other end a hook 4 and an elevated bridge-piece or bar-rest 5, extended from one to the other side-bar of the loop. The hook at one end of a link engages the cross-bar at the end of another link, and the elevated bridge serves as a rest for the end of the bar and to receive the rivet. The sprocket projections $e$ of the sprocket wheels E enter the spaces of the links, as shown by dotted lines Fig. 1. The bars, at a point between their ends, are shown as connected together at their edges by auxiliary connecting devices, shown as links $f$, the connection being a loose one so that the portions of the bars embraced by the links may slip in the links as the travel of the apron changes from a straight into a curved path, or vice-versa.

While I prefer to use metal for the bars of the apron, yet this invention is not limited only to the use of metal bars, but metal bars are far superior in action to bars of any other material.

The hook 4 is bent less than usual in sprocket chain links, and the bars are of such width with relation to the links, as shown in the drawings, as to extend over the cross bars 2, and thus aid the hook with but slight curvature to make a strong connection in the completed chain.

Having described my invention, what I claim as new, and desire to secure by Letters Patent, is—

1. In a machine for drying wool and other fiber, the herein described apron, composed of a series of thin bars provided with openings $b$ and chains to which they are attached, the longitudinal edges of adjacent bars being slightly separated from each other, said chains being composed of links having hooks and cross-bars to unite them together, substantially as described.

2. In a machine for drying wool and other fiber, an apron consisting of a series of thin metallic bars having openings $b$, and a series of links having hooks, and cross-bars and elevated bridges between and connecting said hooks and cross bars, the ends of the bars being rigidly secured to the bridges of the links, substantially as described.

3. An apron consisting of a series of thin metallic bars having openings $b$, and a series of links having elevated bridges, hooks, and cross-bars, the ends of the bars being riveted to the chain links, and loose links $f$ connecting said bars and affording opportunity for the bars to travel in both a curved path and in a straight line, substantially as described.

4. An apron composed of a series of links $d$ having at one end a cross-bar and at its other end a hook, and a series of thin metallic bars attached to said chains and extending across and to bridge a part of a hook and keep a cross bar of a chain link in a hook, substantially as described.

5. An apron consisting of a series of thin metallic bars having openings $b$, and a series of links having elevated bridges, hooks, and cross-bars, the ends of the bars being riveted to the chain links, and auxiliary connections located between the said chains and connecting said bars loosely and affording opportunity for the bars to travel in both a curved path and in a straight line, substantially as described.

In testimony whereof I have signed my name to this specification in the presence of two subscribing witnesses.

GEORGE O. WICKERS.

Witnesses:
CHAS. E. STILLINGS,
JAMES L. BRACKETT.